(12) United States Patent
Thompson

(10) Patent No.: US 7,117,683 B2
(45) Date of Patent: Oct. 10, 2006

(54) MAIN ENGINE ELECTRIC START SYSTEM

(75) Inventor: Robert G. Thompson, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 109 days.

(21) Appl. No.: 10/926,161

(22) Filed: Aug. 25, 2004

(65) Prior Publication Data
US 2006/0042267 A1    Mar. 2, 2006

(51) Int. Cl.
*F02C 7/26* (2006.01)
(52) U.S. Cl. .......................... 60/786; 60/784
(58) Field of Classification Search ................. 60/778, 60/786, 787, 784, 39.15, 801, 39.091
See application file for complete search history.

(56) References Cited

U.S. PATENT DOCUMENTS

| | | | | |
|---|---|---|---|---|
| 3,711,044 A | * | 1/1973 | Matulich | 244/118.5 |
| 4,116,006 A | * | 9/1978 | Wallis | 60/709 |
| 5,003,767 A | * | 4/1991 | Rodgers | 60/788 |
| 5,123,239 A | * | 6/1992 | Rodgers | 60/778 |
| 5,131,225 A | * | 7/1992 | Roettger | 60/785 |
| 5,165,232 A | * | 11/1992 | Amelio et al. | 60/416 |
| 5,174,109 A | * | 12/1992 | Lampe | 60/788 |
| 5,184,458 A | * | 2/1993 | Lampe et al. | 60/787 |
| 5,245,820 A | * | 9/1993 | Zalewski et al. | 60/39.08 |
| 5,309,708 A | * | 5/1994 | Stewart et al. | 60/787 |
| 5,343,778 A | * | 9/1994 | Romero et al. | 74/661 |
| 5,408,821 A | * | 4/1995 | Romero et al. | 60/778 |
| 5,899,411 A | * | 5/1999 | Latos et al. | 244/53 A |
| 5,986,462 A | * | 11/1999 | Thomas et al. | 324/771 |
| 6,588,211 B1 | * | 7/2003 | Friebe et al. | 60/716 |
| 6,634,596 B1 | * | 10/2003 | Albero et al. | 244/53 A |
| 6,786,209 B1 | * | 9/2004 | Stewart | 123/568.11 |
| 6,829,899 B1 | * | 12/2004 | Benham et al. | 60/787 |

* cited by examiner

*Primary Examiner*—William Rodriguez
(74) *Attorney, Agent, or Firm*—Stephen G. Mican

(57) ABSTRACT

A main engine electric start system for gas turbine propelled aircraft that employs a low-power AC electrical power system to serve as an independent grid to control the functions of induction-type dynamoelectric machines coupled to the main propulsion engines and APU as a starter or generator.

26 Claims, 1 Drawing Sheet

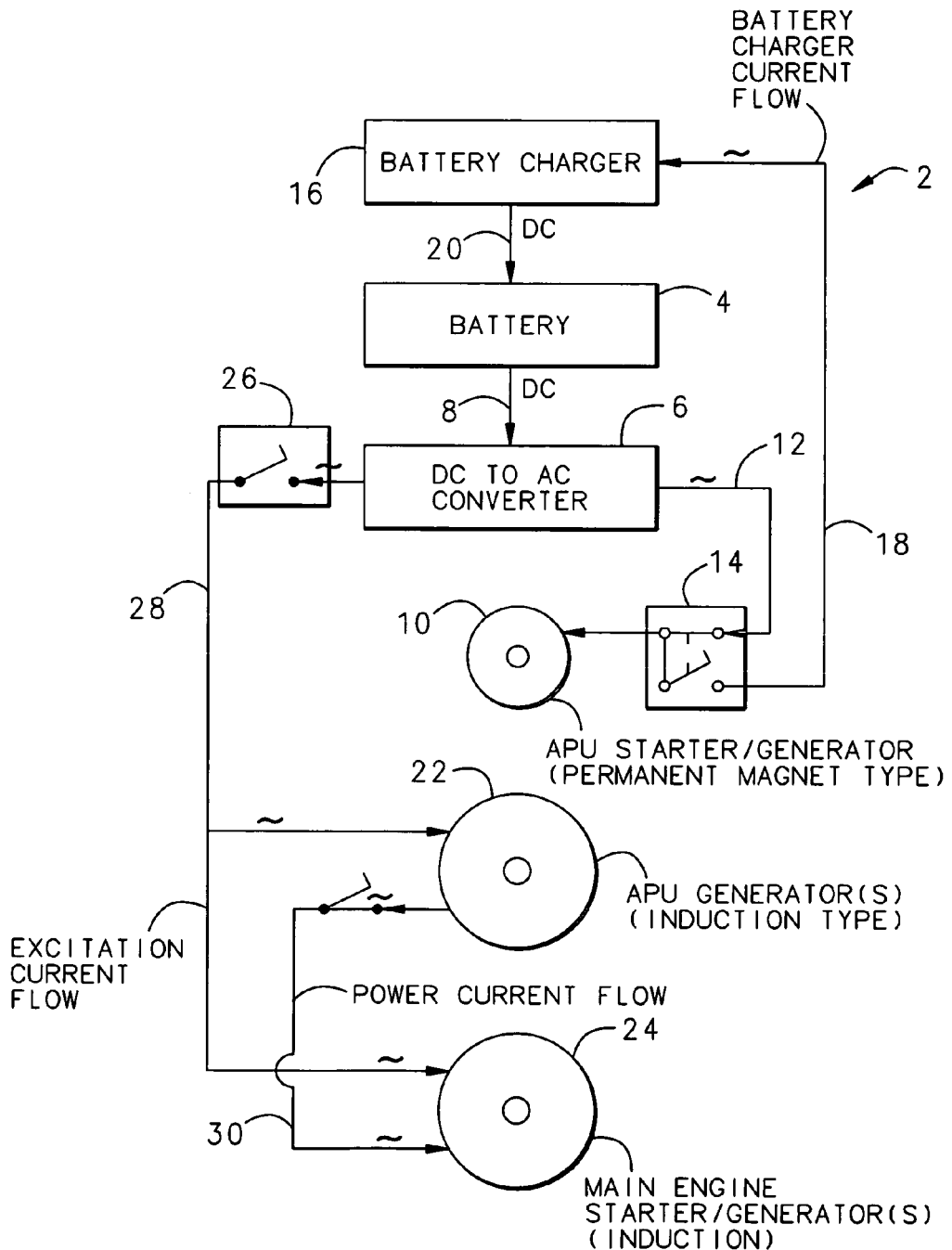

MAIN ENGINE ELECTRIC START SYSTEM

FIELD OF THE INVENTION

The invention relates to engine starting systems for aircraft, and more particularly to engine starting systems for starting gas turbine propulsion engines aboard aircraft.

BACKGROUND OF THE INVENTION

Modern aircraft secondary power systems are becoming large with increasing demands for electric power and large power for starting the prime propulsion engines. These aircraft have a gas turbine powered auxiliary power unit (APU) on board to provide electrical, hydraulic and pneumatic power for operating systems aboard the aircraft when the propulsion engines are shut down as well as to provide power for starting the propulsion engines. Typically, pneumatic power, provided by a load compressor within the APU, has been used to start the propulsion engines. The load compressor has also been used to provide compressed air for the environmental control system (ECS) aboard the aircraft before and after the propulsion engines are started.

The main engine start (MES) requires much more compressed air from the APU than the ECS load. Since the load compressor is used for both the MES mode and the ECS mode, the APU is sized well above the needs by the MES requirement. The APU is thus oversized for the ECS mode and it is heavier, more costly and less efficient than if it were sized to match the ECS load alone. The heavier APU and its support structure detract from the aircraft fuel load or payload. The excess APU weight therefore shortens the range of the aircraft or reduces its payload.

A co-pending application having the same inventorship and owned by the assignee of this application, describes a combined power start system using pneumatic power combined with concurrent APU electric power, hydraulic power, or both electric and hydraulic power to start the main propulsion engines. This approach results in sizing the APU pneumatic system more consistently with both MES and ECS need, avoiding excess weight that would otherwise result from over-sizing the pneumatic portion of the ECU.

When the APU electric power is used to supplement or replace pneumatic power for MES, it has been usual practice to rectify alternating current (AC) power generated by the APU generator or starter/generator to direct current (DC) power, and then convert the rectified DC power back to AC power at a preferred frequency that is suited to the rest of the aircraft electrical power system. For constant frequency aeronautical electrical power systems, 400 Hz is generally preferred.

A problem with this approach is that much power must be converted, and since electrical conversion equipment is of limited efficiency, significant power conversion loss occurs and this power loss generates heat that must be dissipated. Excess power must be generated to cover the power loss and excess equipment must be provided to dissipate the resulting heat. These factors lead to increased system weight and cost that negatively impact the economics, payload and range of the aircraft.

SUMMARY OF THE INVENTION

The invention comprises a main engine electric start system for gas turbine propelled aircraft that employs a low-power AC electrical power system to serve as an independent grid to control the functions of induction-type dynamoelectric machines coupled to the main propulsion engines and APU as a starter or generator. Only low-power DC to AC and AC to DC conversion equipment is required for the independent grid, so little power loss and resulting heat occurs.

In a preferred embodiment, the invention comprises a main engine electrical start system for a gas turbine propulsion engine in an aircraft that has a gas turbine engine powered auxiliary power unit (APU), comprising: a battery for supplying direct current (DC) electrical power; a DC to alternating current (AC) power converter for converting at least some of the DC power from the battery to AC power of desired frequency for an independent electrical power grid; a first dynamoelectric machine coupled to the APU for starting the engine of the APU from AC power supplied by the power converter; a second dynamoelectric machine of the induction type coupled to the APU that receives excitation current from the power grid generated by the power converter for generating AC power at the frequency of the power grid; and a third dynamoelectric machine of the induction type coupled to the propulsion that receives AC excitation current from the power grid generated by the power converter and AC power from the second dynamoelectric machine for starting the propulsion engine.

DESCRIPTION OF THE DRAWINGS

FIG. 1 is a block diagram of a main engine electric start system according to a preferred embodiment of the invention.

DETAILED DESCRIPTION OF THE INVENTION

The invention simplifies and downsizes electrical conversion components used to provide electric power aboard aircraft. The basis of the improvement afforded by the invention is the practice of using an induction-type dynamoelectric machine to serve as a motor or a generator in applications where an independent power grid is available.

An industrial induction-type dynamoelectric machine that is connected across the lines of an existing electric power grid shall run up to a synchronous rotational velocity that corresponds to its number of poles and the frequency of the power grid. For instance, a two-pole dynamoelectric machine shall accelerate to and sustain a rotational velocity of 3600 rpm unloaded on a 60 Hz power grid. A four-pole machine would accelerate to and sustain a rotational velocity of 1800 rpm unloaded on the same grid.

If a load is placed upon the driveshaft of the dynamoelectric machine, "slippage" of the dynamoelectric machine occurs, which causes electrical power to be converted to mechanical torque on the driveshaft that is transferred to the load. In this case, the dynamoelectric machine acts as an electric motor. Typical induction-type dynamoelectric machines that function as motors have "slip" factors in the three to six percent range, meaning that four pole versions of such electric motors typically run between 1700 and 1750 rpm under full load on a 60 Hz power grid.

Similarly, such an induction-type dynamoelectric machine that has its driveshaft driven by a mechanical power source, such as an engine, shall convert mechanical torque into electrical power at the power grid frequency when the dynamoelectric machine is driven faster than the synchronous rotational velocity that corresponds to its number of poles and the power grid frequency. In this case, the dynamoelectric machine acts as an electric generator. Typical induction-type dynamoelectric machines that function as generators have what is sometimes called negative "slip" factors in the three to six percent range, meaning that the four pole versions of such electric generators typically are driven between 1850 and 1900 rpm to produce their rated output.

As explained above, 400 Hz is the generally preferred AC power frequency for aeronautical electrical systems. A two-pole dynamoelectric machine would have a synchronous rotational velocity of 24000 rpm on the power grid of such an electrical system, whereas a four-pole machine would have a synchronous rotational velocity of 12000 rpm on the same power grid.

Unfortunately, aeronautical electrical systems in use do not have an independent power grid that would let induction-type dynamoelectric machines function as electric motors and generators in the manner described above. Therefore, it has been the practice to install synchronous-type dynamoelectric machines for electric generators and motors aboard the aircraft and use high power DC to AC and AC to DC conversion equipment to control the rotational velocities of the machines to conform to the preferred AC power frequency of the aeronautical secondary power electrical system.

The invention creates a low-power independent electric power grid in aeronautical secondary power electrical systems that substitutes for the independent power grid that is relied upon for industrial systems that use induction-type dynamoelectric machines. FIG. 1 is a block diagram of a main engine electric start system 2 according to a preferred embodiment of the invention. A system battery 4 delivers DC power to a conventional low-power DC to AC power converter 6 through a DC power line 8. The output of the power converter 6 is sufficient in power and frequency to drive an APU starter/generator 10 for an aircraft APU (not shown). The APU starter/generator 10 is typically a permanent magnet type dynamoelectric machine.

AC power from the power converter 6 is delivered to the APU starter/generator 10 through an AC power line 12 and a closed first position of a two-position switch 14 for starting the APU engine. The starter/generator 10 then operates as a motor to convert the electrical power that it receives from the power converter 6 to mechanical power that accelerates the engine of the APU. Once the APU engine starts and reaches a self-sustaining rotational velocity, the switch 14 flips from its first position to a second position to break the transfer of electrical power from the power converter 6 to the starter/generator 10. The starter/generator 10 then operates as a generator and electrical power generated by the starter/generator 10 is delivered to a battery charger 16 through the closed second position of the switch 14 and an AC power line 18. The battery charger 16 charges the battery 4 through a DC power line 20.

Once the APU engine reaches normal rotational velocity, an APU dynamoelectric machine 22 of the induction type may serve as a generator to supply modest AC power to the aeronautical secondary power electrical system in which the start system 2 is installed. Likewise, a main engine dynamoelectric machine 24 of the induction type for an aircraft propulsion engine (not shown) may serve as a starter/generator for the propulsion engine. However, for the machines 22 and 24 to serve in these respective capacities, excitation by an independent electric power grid is required, as explained above.

According to the invention, the independent electric power grid for providing excitation current for the machines 22 and 24 is provided by the power converter 6. AC power from the power converter 6 is delivered to the machines 22 and 24 through a switch 26 that is closed when the APU engine reaches normal rotational velocity and an excitation power line 28 at a power and frequency that is suitable for excitation. As explained above, this frequency is typically 400 Hz for aeronautical secondary power systems that employ constant frequency power, but it may also be variable for aeronautical secondary power electrical systems that employ variable frequency power.

The machine 22 may function as a generator by running it above the synchronous rotational velocity of the machine 22 that corresponds to the frequency of the excitation current and the number of poles in the machine 22. In normal operation, the machine so functions a generator when the APU engine reaches normal rotational velocity.

Likewise, the machine 24 may serve as a starter motor for the propulsion engine. Electrical power for the machine 24 is supplied by the machine 22 through a power line 30. The machine 24 may also serve as a generator once the propulsion engine reaches normal rotational velocity and drives the machine above the synchronous rotational velocity of the machine 24 that corresponds to the frequency of the excitation current and the number of poles in the machine 24.

Contrary to other aeronautical electrical start systems that convert the non-matching generator and motor large output power to desired power frequencies, the system 2 according to the invention converts only modest power to excite the driving and driven rotating components, namely, the machines 22 and 24. The excitation current provided by the power converter 6 serves the function of an independent power grid so that induction-type machines may be employed as motors or generators as needed.

The main engine electrical start system 2 as described above may be implemented as the sole means for starting main propulsion engines, or preferably it may be used in combination with a pneumatic start system, a hydraulic start system or the combination thereof, as described in the co-pending patent application identified above. Such a combined power start system optimises the sizing of the APU needed for the aircraft, thus minimising cost, size and weight of the start system.

Described above is a main engine electric start system for gas turbine propelled aircraft that employs a low-power AC electrical power system to serve as an independent grid to control the functions of induction-type dynamoelectric machines coupled to the main propulsion engines and APU as a starter or generator. It should be understood that this embodiment of the invention is only an illustrative implementation of the invention, that the various parts and arrangement thereof may be changed or substituted, and that the invention is only limited by the scope of the attached claims.

The claim invention is:

1. A main engine electrical start system for a gas turbine propulsion engine in an aircraft that has a gas turbine engine powered auxiliary power unit (APU), comprising:

a battery for supplying direct current (DC) electrical power;

a DC to alternating current (AC) power converter for converting at least some of the DC power from the battery to AC power of desired frequency for an independent electrical power grid;

a first dynamoelectric machine coupled to the APU for starting the engine of the APU from AC power supplied by the power converter;

a second dynamoelectric machine of the induction type coupled to the APU that generates AC power at the frequency of the independent electrical power grid when the second dynamoelectric machine receives AC excitation current from the power grid generated by the DC to AC power converter; and a third dynamoelectric machine of the induction type coupled to the propulsion engine that starts the propulsion engine when the third dynamoelectric machine receives AC excitation current from the independent electrical power grid generated by the DC to AC power converter and AC power generated by the second dynamoelectric machine.

2. The system of claim 1, further comprising a first electrical switch for coupling the first dynamoelectric machine to AC power from the DC to AC power converter whilst starting the engine of the APU in a motor mode.

3. The system of claim 2, further comprising a battery charger for charging the battery when the first electrical switch decouples the first dynamoelectric machine from AC power from the DC to AC power converter after the APU engine reaches a self-sustaining rotational velocity and couples AC power generated by the first dynamoelectric machine whilst in a generating mode to the battery charger.

4. The system of claim 3, wherein DC power generated by the battery charger is coupled to the battery.

5. The system of claim 1, further comprising a second electrical switch for coupling the energising current to the second and third dynamoelectric machines after the APU engine reaches normal rotational velocity.

6. The system of claim 1, wherein the third dynamoelectric machine generates AC power at the frequency of the independent electrical power grid when the propulsion engine reaches normal rotational velocity.

7. The system of claim 1, wherein the first dynamoelectric machine is a starter/generator of the permanent magnet type.

8. The system of claim 1, wherein the second dynamoelectric machine is an induction-type generator.

9. The system of claim 1, wherein the third dynamoelectric machine is an induction-type starter/generator.

10. The system of claim 1, wherein the desired frequency of the independent electrical power grid is constant in accordance with the requirements of a constant frequency secondary power system.

11. The system of claim 10, wherein the desired frequency of the independent electrical power grid is 400 Hz.

12. The system of claim 1, wherein the desired frequency of the independent electrical power grid is variable in accordance with the requirements of a variable frequency secondary power system.

13. A main engine electrical start system for a gas turbine propulsion engine in an aircraft that has a gas turbine engine powered auxiliary power unit (APU), comprising:

a battery for supplying direct current (DC) electrical power;

a DC to alternating current (AC) power converter for converting at least some of the DC power from the battery to AC power of desired frequency for an independent electrical power grid;

a first dynamoelectric machine coupled to the APU for starting the engine of the APU from AC power supplied by the DC to AC power converter;

a first electrical switch for coupling the first dynamoelectric machine to AC power from the DC to AC power converter whilst starting the engine of the APU in a motor mode;

a battery charger for charging the battery when the first electrical switch decouples the first dynamoelectric machine from AC power from the DC to AC power converter after the APU engine reaches a self-sustaining rotational velocity and couples AC power generated by the first dynamoelectric machine whilst in a generating mode to the battery charger;

a second dynamoelectric machine of the induction type coupled to the APU that generates AC power at the frequency of the independent electrical power grid when the second dynamoelectric machine receives AC excitation current from the independent electrical power grid generated by the DC to AC power converter;

a third dynamoelectric machine of the induction type coupled to the propulsion engine that starts the propulsion engine when the third dynamoelectric machine receives AC excitation current from the independent electrical power grid generated by the DC to AC power converter and AC power generated by the second dynamoelectric machine; and a second electrical switch for coupling the independent electrical power grid to the second and third dynamoelectric machines after the APU engine reaches normal rotational velocity.

14. The system of claim 13, wherein DC power generated by the battery charger is coupled to the battery.

15. The system of claim 13, wherein the third dynamoelectric machine generates AC power at the frequency of the independent electrical power grid when the propulsion engine reaches normal rotational velocity.

16. The system of claim 13, wherein the first dynamoelectric machine is a starter/generator of the permanent magnet type.

17. The system of claim 13, wherein the second dynamoelectric machine is an induction-type generator.

18. The system of claim 13, wherein the third dynamoelectric machine is an induction-type starter/generator.

19. The system of claim 13, wherein the desired frequency of the independent electrical power grid is constant in accordance with the requirements of a constant frequency secondary power system.

20. The system of claim 19, wherein the desired frequency of the independent electrical power grid is 400 Hz.

21. The system of claim 13, wherein the desired frequency of the independent electrical power grid is variable in accordance with the requirements of a variable frequency secondary power system.

22. A main engine electrical start system for a gas turbine propulsion engine in an aircraft that has a gas turbine engine powered auxiliary power unit (APU), comprising:

a battery for supplying direct current (DC) electrical power;

a DC to alternating current (AC) power converter for converting at least some of the DC power from the battery to AC power of desired frequency for an independent electrical power grid;

a first dynamoelectric machine of the permanent magnet type coupled to the APU for starting the engine of the APU from AC power supplied by the DC to AC power converter;

a first electrical switch for coupling the first dynamoelectric machine to AC power from the DC to ÄC power converter whilst starting the engine of the APU in a motor mode;

a battery charger coupled to the battery for charging the battery when the first electrical switch decouples the first dynamoelectric machine from AC power from the DC to AC power converter after the APU engine reaches a self-sustaining rotational velocity and couples AC power generated by the first dynamoelectric machine whilst in a generating mode to the battery charger;

a second dynamoelectric machine of the induction type coupled to the APU that generates AC power at the frequency of the independent electrical power grid when the second dynamoelectric machine receives AC excitation current from the independent electrical power grid generated by the DC to AC power converter;

a third dynamoelectric machine of the induction type coupled to the propulsion engine that starts the propulsion engine when the third dynamoelectric machine receives AC excitation current from the independent electrical power grid generated by the DC to AC power converter and AC power generated by the second dynamoelectric machine; and a second electrical switch for coupling the independent electrical power grid to the second and third dynamoelectric machines after the APU engine reaches normal rotational velocity.

23. The system of claim 22, wherein the third dynamoelectric machine is an induction-type starter/generator.

24. The system of claim 22, wherein the desired frequency of the independent electrical power grid is constant in accordance with the requirements of a constant frequency secondary power system.

25. The system of claim 24, wherein the desired frequency of the independent electrical power grid is 400 Hz.

26. The system of claim 22, wherein the desired frequency of the independent electrical power grid is variable in accordance with the requirements of a variable frequency secondary power system.

* * * * *